Feb. 4, 1930.  C. A. STYER  1,745,875
DEOXIDIZING SYSTEM
Filed April 5, 1928   2 Sheets-Sheet 1
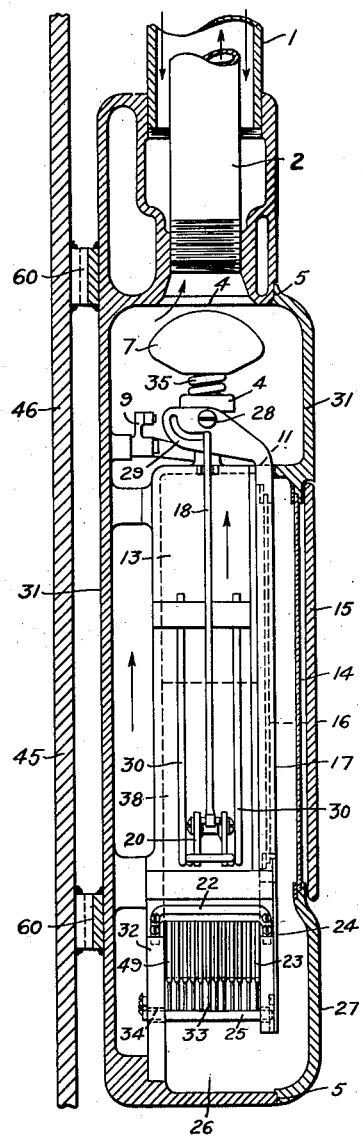
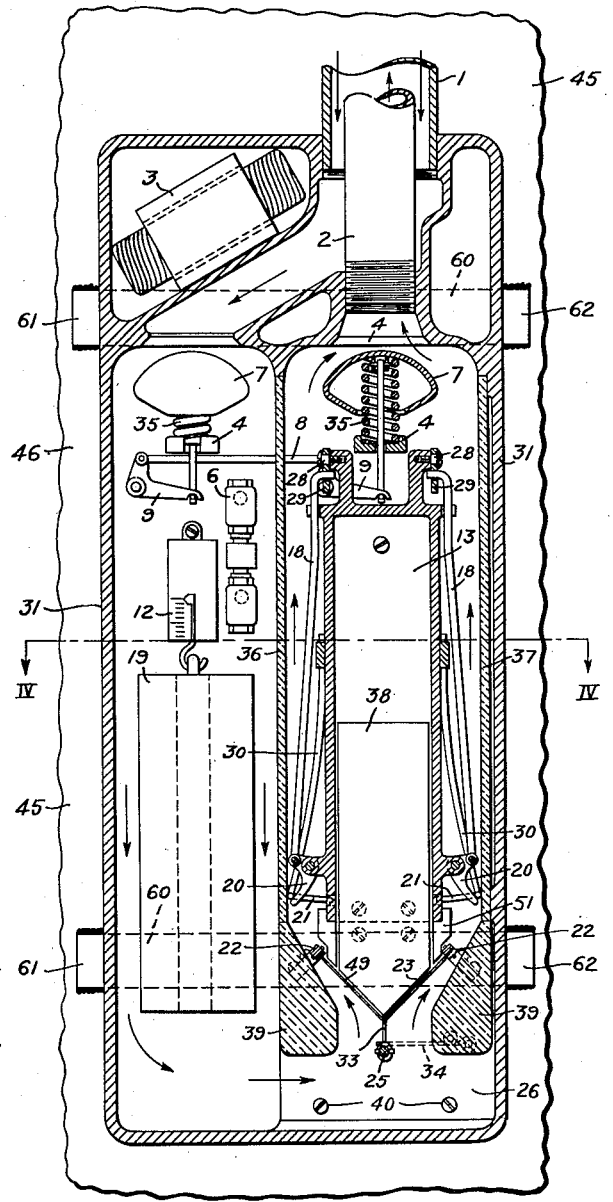
INVENTOR
Charles A. Styer.
BY
ATTORNEY Feb. 4, 1930.　　C. A. STYER　　1,745,875
DEOXIDIZING SYSTEM
Filed April 5, 1928　　2 Sheets-Sheet 2
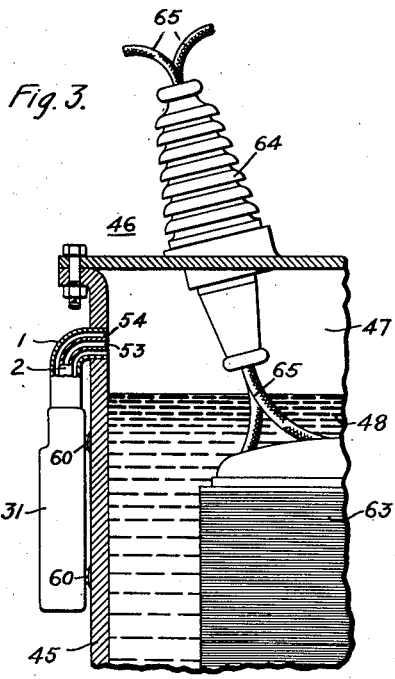
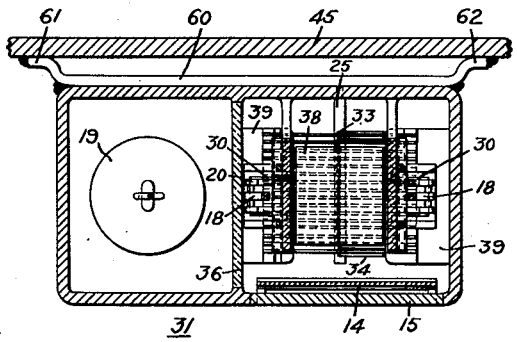
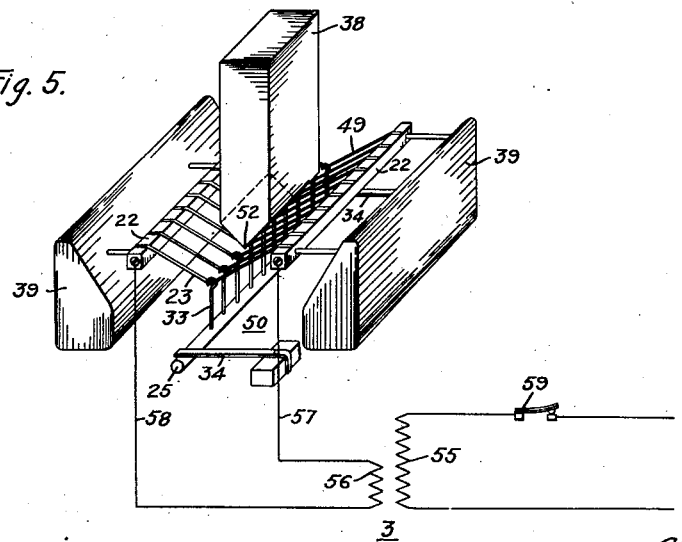
INVENTOR
*Charles A. Styer.*
BY
*Wesley G. Carr*
ATTORNEY Patented Feb. 4, 1930

1,745,875

UNITED STATES PATENT OFFICE

CHARLES A. STYER, OF WILKINSBURG, PENNSYLVANIA, ASSIGNOR TO WESTINGHOUSE ELECTRIC & MANUFACTURING COMPANY, A CORPORATION OF PENNSYLVANIA

DEOXIDIZING SYSTEM

Application filed April 5, 1928. Serial No. 267,789.

My invention relates to improvements in apparatus for providing inert atmosphere in which the temperature of a deoxidizing material is elevated in the presence of the inert atmosphere to bring about the conversion of the material to an inert gas at the expense of any oxygen that may be present in said gas, as set forth in my copending application, Serial No. 683,379, filed December 29, 1923.

The objects of my improvement are, first,

To provide a practical structure whereby my invention disclosed in the above application may be successfully made applicable to commercial operating conditions, second, To afford a mechanical design of apparatus which will so embody the essential features as to meet the requirements of manufacturing and operating simplicity and fool proofness in operation, third, To add to the heater for raising the temperature of the deoxidizing material the function of continuously circulating the atmosphere adjacent to the heated surface of the deoxidizing material, fourth, To increase the rate of gas circulation automatically in accordance with the quantity of oxygen present in the gas, and fifth, To provide a "streamline" circulating system for the gas to facilitate the deoxidizing process, sixth, To permit easy and thorough inspection of the cabinet contents without the necessity of opening the circulating system to the air, seventh, To provide an arrangement whereby the deoxidizing material may be recharged without the possibility of injury to the heating grid, eighth, To utilize the directing walls for the gas near the heated surface for reflecting heat to thereby increase the efficiency of the heating grid, ninth, To automatically close and seal off the gas cushion from the outside air whenever the cabinet is opened, tenth, To change the deoxidizing material from granular or powdered form to that of solid blocks, eleventh, To decrease the tendency towards the formation of carbon monoxide and to increase the formation of carbon deoxide when carbon is used as a deoxidizing material, twelfth, To permit the use of a deoxidizing material containing ash-forming constituents, thirteenth, To provide means in the heater screen for removing the ash product of oxidation of the deoxidizing material in accordance with the rate of, and so as not to affect, the deoxidizing reaction, and fourteenth, To use a coherent block of deoxidizing material upon a non-ash-accumulating structure that serves both as a heater and as a support for said block.

I attain these and other useful and desirable objects which will be explained or are apparent in the following description by the apparatus illustrated in the accompanying drawing in which:

Figure 1 is a vertical section of my improved deoxidizing apparatus;

Fig. 2 is a vertical section of the apparatus shown in Fig. 1;

Fig. 3 is a view, partially in elevation and partially in section, of my deoxidizing apparatus applied to a transformer;

Fig. 4 is a section, taken on the line IV—IV of Fig. 1; and

Fig. 5 is a schematic diagram, in distorted perspective, of the electrical circuit of the heating grid.

Similar numerals refer to similar parts throughout the several views.

The present method for producing an inert atmosphere has been developed to facilitate removal of oxygen from the air which is breathed into the gas space above the oil in large transformers and similar electrical apparatus, as a consequence of expansions and contractions of the tank contents caused by temperature changes. The purposes of the removal of the oxygen are the preservation of the oil against deterioration by contact with oxygen and the prevention of the possible accumulation of a combustible gas mixture within the apparatus tank.

A continuous recirculation of the gaseous contents of the transformer tank, bringing such gases in repeated contact with the heated surface of a deoxidizing material which is located at one point in the circuit, characterizes the present method of maintaining an inert atmosphere in a transformer tank above the oil level.

The deoxidizing material or "deox", so named for the sake of brevity, is a block of specially prepared carbon, part of the surface of which is held at a temperature sufficiently elevated to bring about the conversion of the solid carbon to inert, gaseous carbon dioxide at the expense of any oxygen that may be present in the gases. My copending application, U. S. Serial No. 267,788, filed April 5, 1928, discloses and describes the composition and preparation of a deoxidizing material that may be used in connection with the apparatus herein disclosed.

Referring to the drawings, Fig. 1 represents a section of Fig. 2 taken on the center plane of pipe 2 downwardly to a point just above valve 7, thence horizontally to a plane just to the level of partition 36, such partition and block 39 being removed to expose the parts at their right.

A box or cabinet 31 is mounted at an easily accessible height on the side 45 of a transformer tank 46 and is connected to the gas space 47 above the level of the oil 48 by means of pipes 1 and 2. The location of one pipe within another, as indicated, is for the purpose of saving space and is not necessarily essential to the operation of my device.

The gas is heated by the hot wires 49 of grid 23 and such gas is thereby decreased in density and rises, as indicated by the arrows, through pipe 2 to the space 47 above the oil 48 and displaces from that region a cooler stream of gas downward through pipe 1. The left-hand compartment of the cabinet may be regarded simply as a continuation of the pipe 1 enlarged to accommodate a refillable, indicating dehydrator 19 and breathing seals.

The indicating dehydrator 19 operates substantially in accordance with the principle disclosed and described in U. S. Letters Patent No. 1,601,308 which issued on September 28, 1926 to Leland H. Hill and was assigned to the assignees of the present application. The breathing seals 6 may constitute any suitable breathing seals, but I prefer that they shall be made in accordance with the disclosure of the above-mentioned Letters Patent.

The block of deoxidizing material 38 or "deox" block is contained within the compartment 13. The block 38 rests upon the electrically heated V-shaped grid 23 and feeds downward by gravity as it is burned away at the bottom by any oxygen that may be present in the ascending gas stream.

The removable grid unit 50, illustrated most clearly in Fig. 5, comprises terminal bars 22, parallel-connected heater wires 23, stay-hooks 33, take-up spring 34, front panel 24, hook bar 25, back panel 32, heat reflectors 39 and the guides 51 of heat-insulating material immediately above the bars 22. All of the above elements comprising the heating grid 50 are secured for easy removal by screws 40 that will be more fully described hereinafter.

Any ash resulting from the combustion of the surface 52 of the deoxidizing block 38 falls through the grid 49 as a powder and is collected in the space 26. All parts are enclosed behind a side-hinged door 27 that is fitted to the cabinet 31 to make a fairly tight enclosure, as indicated by the peripheral seat 5.

A glass window 14, protected by a top-hinged cover 15, is provided to permit inspection of the indicator 12 of the dehydrator 19 and of the height of the unconsumed deox 38 without necessitating the opening of the cabinet. The deox 38 is visible behind a glass panel 16 in the charging door 17.

When it becomes necessary to put a new block of deoxidizing material on the grid 50 or to open the door of the cabinet for any other reason, the unlatching of the door allows the mushroom valves 7 to be closed by their springs 35 against seats 4.

A closure of the valve 7 shuts off pipes 1 and 2 and thus protects the inert atmosphere 47 above the oil 48 against leakage to the outside air. When the door is closed and the latching handle (not shown) is turned to secure the door 27, a lug or cam on the shaft of the door-latching device forces bell-cranks 9 to rotate in a clockwise direction to pull the valves 7 into the open position, as indicated in Figs. 1 and 2. The bell-cranks 9 are connected together by a connecting link 8 so that they operate in unison when the door 27 is opened or closed.

The deox chamber 13 is opened for charging, by raising door 17 that is suitably hinged at 28 and is provided with slot lugs 29 at each side. Guided by these slots, the rods 18 are lowered and the bell-cranks 20 are rotated, allowing flexed spring members 30 to be released toward the sides of the deox holder and thus to bias their projections 21 toward the side walls of the container 13. The projecting fingers 21 then either impinge upon the sides of the deox block 38 which is in the holder and grip it in case it has not descended below the fingers 21 or else they protrude well into the center of the holder and serve as a temperory support upon which a new block of deoxidizing material is placed. In serving as a support to receive a new block, the fingers protect the grid 50 from mechanical damage by any careless handling of the block that is being inserted. When the door 17 is closed, the fingers 21 are withdrawn, and the block gently drops into position.

All of the circulating gas from the space 47 is caused to pass between the insulating blocks 39 and the heated deoxidizing surfaces 52 at the lower end of the deox block by the projecting shelf 11 which prevents any possible by-passing of gas from the bottom of the cabinet upward in front of the holder 13, and by plates in the same plane as the charging door extending on each side of the latter from the front edges of holder 13 to the walls 36 and 37. These plates extend from the top of front panel 24 of the grid structure to the top of shelf 11, as indicated in the side view by a broken line 10 which represents the upper boundary of the plates.

It may be well to mention here that the linear scale of the drawings, as shown in Figs. 1, 2 and 4 is approximately one-quarter full size, and the drawing represents a deoxidizing capacity of approximately 400 cubic feet of air on one charge of deox consisting of a block 3″ x 3″ x 10″.

Whenever appreciable quantities of oxygen are present, the rate of gas circulation is increased by the evolved reaction heat between the deox and the oxygen, an effect which automatically acts to hasten clean-up.

By providing a direct connection from the deoxidizing chamber to the gas-cushion chamber, with as few offsets, bends and constrictions in the circulating system as possible, I increase the clean-up of the oxygen within the gas cushion 47. The use of a streamline design, which is a feature of my invention, permits the use of smaller pipes than is possible where angles, pockets, sudden changes in section and increased horizontal runs are utilized in the gas path.

The entrance and exist orifices 53 and 54 may be placed within a few inches of each other. Wide separations of these orifices or the use of a baffle between them to reduce short circuit is not warranted because diffusion acts to rapidly mix the gas in the free space 47 above the oil 48. The deoxidizing apparatus is connected to the tank 46 in such manner that as little leakage as possible is provided. Minute leaks, however, are not necessarily fatal to the operation of my deoxidizing apparatus, since the recirculating feature of the gases results in the ultimate consumption of the oxygen, regardless of how the oxygen is introduced into the gases.

In prior deoxidizing system, it has been found necessary to reduce breathing by the use of a breathing regulator. As a consequence of the low cost of the deoxidizing material applicable to my apparatus, it is possible to avoid the use of such breathing regulator, thereby permitting my apparatus to permit breathing in both directions at practically atmospheric pressure.

In such case, it is desirable to use a two-way seal to prevent diffusion through the breathing connection.

The valves 7 automatically close and seal off the gas cushion 47 from the outside air whenever the cabinet is opened. Such automatic feature provides a fool-proof system, materially decreases the consumption of the deoxidizing material, and prevents temporary loss of the protection afforded by the inert gas cushion in gas space 47.

The carbon is preferably used in the form of blocks prepared from powdered or granular material. In my prior application, U. S. Serial No. 683,379, W. E. Case No. 11,045, filed December 29, 1923, I disclose how granular carbon may be used supported upon a screen and surrounded by a heating element for effecting the deoxidation of gases.

The necessary passage of the gas through the body of granular material results in uncontrollable, internal high temperatures during conditions of high oxygen content of the gas being deoxidized that results in an excessive formation of carbon monoxide, i. e., performance is similar to that of an ordinary fuel bed.

With the use of granular carbon, a perfectly ashless carbon is required since any supporting screen with mesh close enough to hold the granular carbon without loss is too close to permit the passage of ash under the influence of gravity. Laboratory prepared charcoals containing as little as 0.05% ash, burned with the slow accumulation upon the supporting screen of a bulky ash which first restricted the passage of gas and finally surrounded the heating element, thus preventing the char from attaining a reactive temperature.

Finally, the use of granular carbon is undesirable because complete absence of ash is not only difficult to obtain and maintain, but it is undesirable because the presence of small amounts of certain ash-forming material definitely improves the oxidizing characteristics of the carbon.

All of the above-mentioned undesirable features necessarily incident to the use of powdered or granular material are removed by the use of a block of material in the apparatus disclosed herein.

I have found, by numerous experiments and considerations, that the most desirable deoxidizing apparatus comprises a non-ash-accumulating structure which serves both as a support and as a heater for a coherent block of deoxidizing material. The grid 50, as illustrated in Fig. 5, is essentially a grid of multiple-connected resistance-alloy conductors, for example, in the form of wires or ribbon, upon which the deox block 38 rests and burns away.

The ash forming on the surface of the block adjacent to the heated surface 52 of the block 38 is crushed through between the wires 23 by the weight of the block which thus feeds continuously toward the grid 50 in accordance with the rate at which the block 38 is being consumed.

I consider the supporting grid 50 to be an important feature of my apparatus, and it will, therefore, be described more in detail hereinafter. While I have set forth and described an automatic protective scheme for preventing careless or forcible insertion of the deox blocks during charging and the consequent damaging of the grid wires, it will be readily apparent to those skilled in the art that various modifications may be made therein without departing from the spirit of this feature of my invention.

The deox compartment 13, with its fairly snug-fitting door 17, is shown completely closed, except at the bottom during operation. This is for the purpose of excluding recirculation of oxygen and consequent burning of the block within the compartment during initial clean-up or other occurrences of high oxygen concentration.

I provide a low-voltage transformer 3, preferably having a continuous capacity of about 100 to 200 watts, that I mount in the cabinet 31, as indicated in Fig. 5. The transformer 3 comprises a primary 55 that is connected to any suitable source of alternating current and a secondary 56 that is connected, by conducting leads 57 and 58, to the grid terminal bars 22 of the heating-grid unit 50.

The necessity of avoiding excessively high block and grid temperatures during periods of high oxygen concentration, at which times more heat is evolved than is needed, requires conditions favoring the rapid removal of heat. On the other hand, economical use of electrical energy for heating and the desirability of heating the grid wires at a low temperature require conditions favoring the conservation of heat and maintenance of the deoxidizing surface temperature when oxygen concentration is low, the condition which exists the major part of the time. Fortunately, these opposing requirements are automatically cared for in my apparatus by the self-adjusting cooling action of the circulating gas. Excessive heat generation is accompanied by increased gas circulation, with consequent heat removal from the heat source to the upper cooling areas.

The principle which applies, therefore, is that the radiant heat from the block and the heater wires be reflected back to the block as completely as is consistent with the requirement of providing, at the same time, a gas path that favors free circulation at a high velocity past the hot surfaces. The members 39, therefore, are good heat reflectors and poor heat conductors.

In addition to improving the reflection and permanence, a smoothly glazed surface, used at a reasonably steep angle, allows any ash particles to roll or slide off that might otherwise fall upon it from the deoxidizing block. Such freedom from ash retention makes possible an advantageous application of the reflecting surfaces by permitting them to extend partway underneath the deox block.

Direct contact of the hot gases leaving the deoxidizing zone with the metallic portions of the cabinet is undesirable because it is advantageous to conserve the heat of the ascending gases until they enter the riser pipe above the cabinet in order to promote the desired thermo-synphonic action. For this reason, I utilize side panels 36 and 37 of transite or other poor conducting material. Further insurance against excessive grid and block temperatures may be provided by the use of a Spencer thermostat 59 that is adapted to operate to open the primary circuit 55 of the transformer 3. The thermostat 59 is preferably located in one of the gas passages above the heater. The use of a thermostat, as utilized above, is preferable to the use of any thermostatic scheme for blocking circulation because I have found the latter to favor the increased formation of carbon monoxide.

It will be noted that the space 36 below the deoxidizing zone has been made generously large. This is to permit the accumulation of ash without interference with the gas circulation. Although amounting to about 1% of the deox, the ash passing through the grid occupies perhaps 30% of the volume of the deox from which it came, it being very light and bulky. Incidentally, the convection of ash dust up into the transformer is negligible, since the ash detaches itself in loosely coherent lumps rather than in minute particles. Whenever the door is opened for charging, the ash may be easily brushed or scraped out from the floor of the cabinet.

The dehydrator 19 is provided in the cabinet to take up any water that may be introduced from the outside air. The heater grid apex is formed and held in alinement by catching each wire under a hook consisting of a small wire clamped in a bar similar to the terminal bars. Such a grid is easy to make and repair, and I have found that over 1300 hours of service of such grid has resulted in no apparent inequality of current distribution and required no repairs. The wires 23 are preferably spaced $\tfrac{3}{16}''$ apart, while a $\tfrac{1}{8}''$ spacing is easily possible by alternating the set-screw holes on opposite sides of the bar, as indicated by the end-on section of the bars 22 in Fig. 2. An apex bar 25 and hooks 33 are shown with the additional use of springs 34 at each end of the bar to keep the wires taut as they expand when heated and to diminish strains produced when dropping the block of deox upon the wires.

The deox guides 51 located immediately above and inside the bars 22 prevent a too rapid removal of heat with a diminution of temperature of the wires 23. These guides are made of material, such as transite, that operates to partially obstruct the transfer of heat from the bars and wires upwardly to the metallic parts, and their shape is such that free circulation of the rising gases is prevented between the wires where they enter the bars.

The whole heater grid structure is assembled as a removable unit secured by screws through the transite panel 32. The front panel is constructed of the same material and is carried by bars 22. The leads 57 and 58 from the transformer 3 are connected to the bars 22 at their back ends. The reflector blocks 39 rest in recesses in the front and back panels and may be lifted out for access to bars 22 when the unit is removed.

I have found that an angle of approximately 90° at the heater grid apex is most satisfactory. I have found also that, during intervals of high oxygen in the gases being deoxidized, the block 38 always burns round at the apex. The apex bar 25, or any such equivalent construction, is located well below the apex of the grid to allow the ash to fall freely into the chamber 26.

Reference has already been made to the function of the radiating reflectors 39. These are essential even though conservation of power is no consideration, because their absence at low-oxygen concentration results in "slicing" of the deox block. Without them, consumption of the block tends to be confined to narrow areas in direct contact with the heated areas of the grid, the intervening parts remaining unoxidized. Unless a condition of increased oxygen soon follows and burns away the slices between the wires, the result is wasted material and ultimate stoppage of all action when the descending slices meet some obstruction below the grid. I have found clean-up speed, moreover, to be greatly reduced by removal of the reflectors 39, not only during the initial stages of high oxygen, but later when the concentration falls to a lower figure, say 5% or lower.

My deoxidizing cabinet 31 may be mounted in any suitable manner on the side 45 of the transformer casing. For example, as illustrated in the drawing, the back of the cabinet may be welded to two retaining straps 60 that are, in turn, welded at their ends 61 and 62 to the side of the transformer casing. In Fig. 3. the upper left-hand corner of a transformer is shown in cross section, in order to show how the pipes 1 and 2 are connected to the side of the transformer casing and communicate with the gas cushion 47 above the oil level 48. The oil 48 immerses a transformer core 63 and its attendant electrical and mechanical structure. An insulating bushing 64 is mounted in cover 46 to suitably conduct the leads 65 through the cover 46 in a manner well known to those skilled in the art.

It may be readily comprehended that my invention is applicable to any apparatus, electrical or otherwise, in which it is desirable to maintain an inert atmosphere in a substantially sealed casing or tube requiring an inert atmosphere for any purpose whatsoever.

Various changes and modifications may be made in my invention without departing from the spirit and scope thereof, as set forth in the appended claims.

I claim as my invention:

1. In combination, a member, means for heating said member, a fluid moved adjacent to said member, and a block of carbonaceous material coacting with said member to deoxidize said fluid.

2. In combination, a plurality of grids disposed in a plurality of angularly disposed intersecting plane surfaces, means for heating said grids, means for passing a fluid to be deoxidized adjacent to said grids, and a solid body of deoxidizing material having surfaces coacting with said grids.

3. In combination, a heated member, a body of deoxidizing material coacting with said member, and means for removing the by-products of the oxidation of said material whereby their presence does not interfere with further oxidation.

4. In combination, a heater, a block of deoxidizing material having a surface coacting with said heater, and means for feeding said block to said heater so that ashes formed by the oxidation of said deoxidizing material do not interfere with further oxidation.

5. The method of feeding deoxidizing material to a heated member which comprises contacting the surface of a block of said material with said member.

6. The method of feeding deoxidizing material to a heater which comprises disposing a block of said material on said heater whereby gravity acts on said block and gently presses the contacting surface thereof against said heater.

7. The method of preparing inert atmosphere which comprises disposing a block of deoxidizing material on a heated member and passing said atmosphere adjacent the surface of said block coacting with said member.

8. The method of deoxidizing the gas in a sealed container which comprises disposing a block of deoxidizing material on a heated member whereby the heat of said member causes convection of said gas across the heated surface of said block of deoxidizing material.

9. In combination, a heated member, deoxidizing material having a surface coacting with said member, means for passing a fluid to be deoxidized across the heated surface of said deoxidizing material and means for forcing the ash residue of the oxidation of said material through said member out of the reaction zone whereby said residue does not interfere with the deoxidizing process.

10. In combination, a heating grate, a block of deoxidizing material coacting therewith, an atmosphere to be deoxidized, and means for directing said atmosphere along the heated surface of said material including a heat-reflecting surface for improving the efficiency of said heating grate.

11. In combination with apparatus for deoxidizing the atmosphere in a sealed container, of inlet and outlet means connecting said apparatus with said container and means for opening said apparatus without disturbing the atmosphere in said container including a door and valves that automatically close said inlet and outlet means when said door is opened.

12. In combination with a heater and a block of deoxidizing material for coaction therewith, of means for protecting said grid from possible damage incident to manual placing of said block on said grid comprising a door and fingers coacting with said door whereby, when the door is open, said fingers limit the position of the block away from the grid and, when the door is closed, permit said block to fall into position on said grid without injury thereto.

13. In combination, a closed chamber communicating with a gas-filled space, a deoxidizing material, a heater in said chamber for said material and means comprising said heater for continuously circulating the gases through said container.

14. A heater for a block of deoxidizing material comprising a plurality of spaced electrical-current conducting members arranged in intersecting planes and means for holding said members in position, whereby the disposal of ash from said block is not interfered with.

15. A heater for a block of deoxidizing material comprising a plurality of spaced electrical-current conducting members arranged in intersecting planes and means including strings coacting with said wires for holding said members in position, whereby the disposal of ash from said block is not interfered with.

In testimony whereof, I have hereunto subscribed my name this 27th day of March, 1928.

CHARLES A. STYER.